April 21, 1970 W. R. THOMAS 3,507,547
TELESCOPE HAVING MULTIPLE OBJECTIVE MIRRORS
Filed Oct. 12, 1965 4 Sheets-Sheet 1
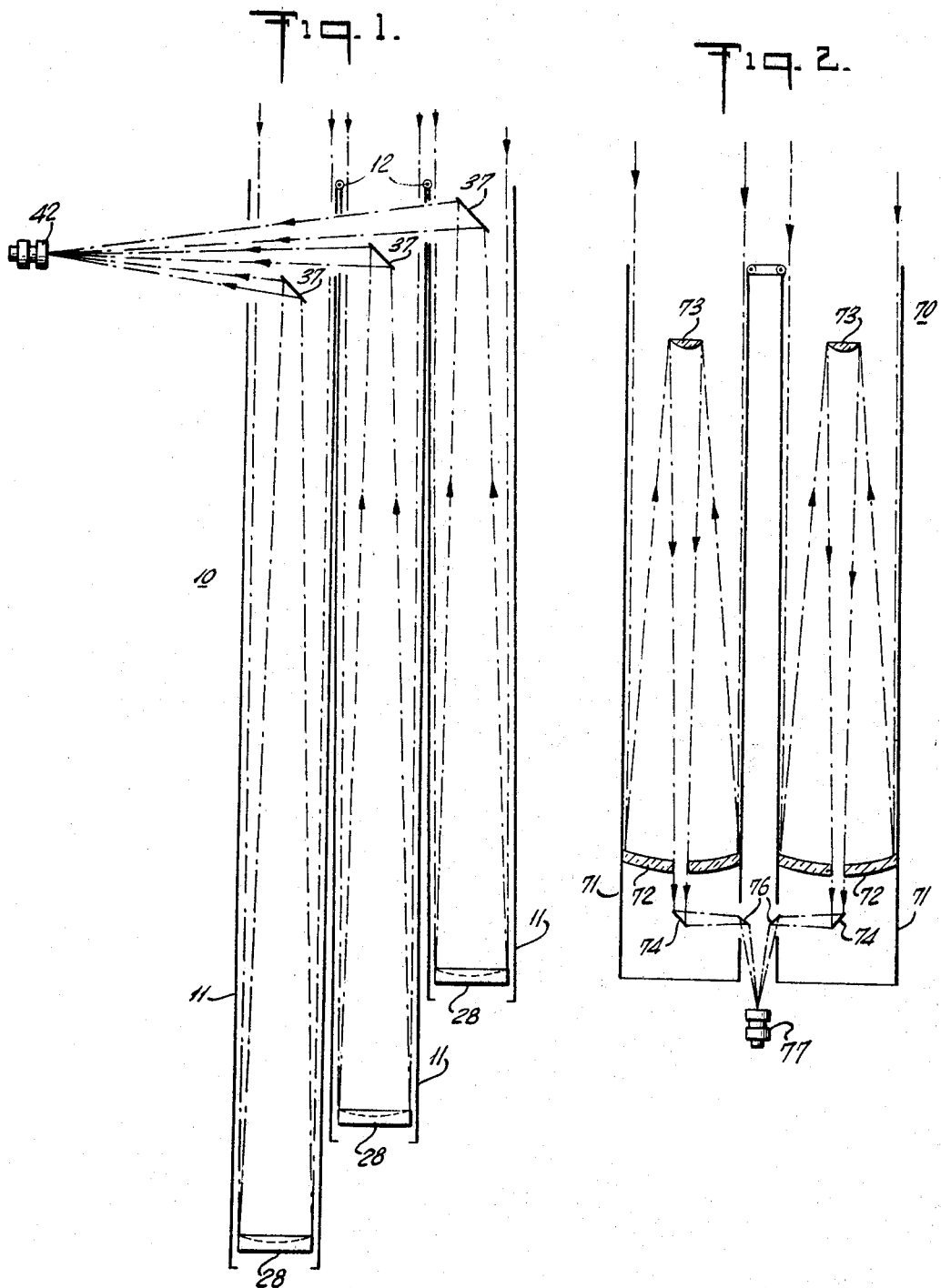
INVENTOR
WARREN R. THOMAS
BY Stanley Wolder
ATTORNEY

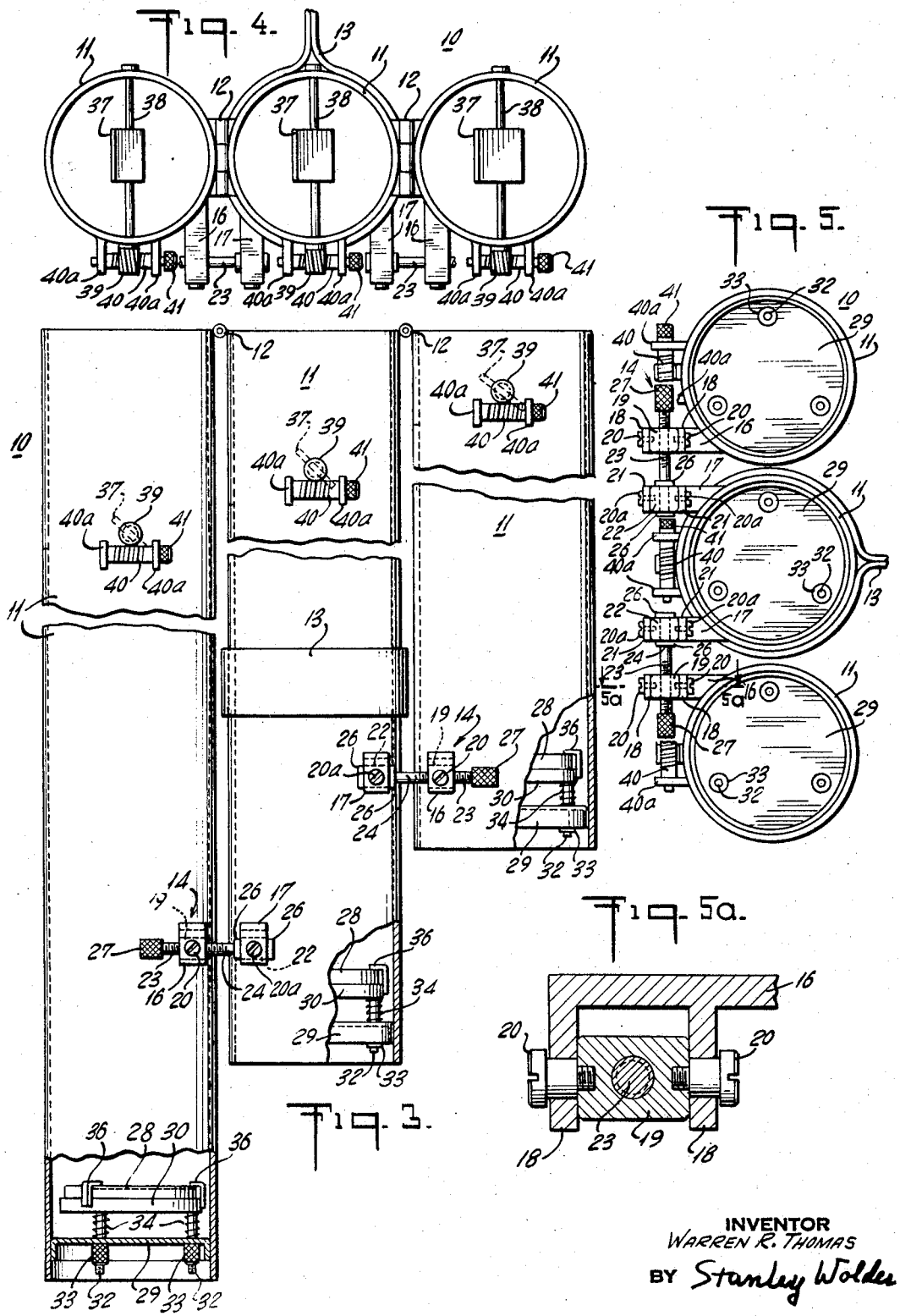

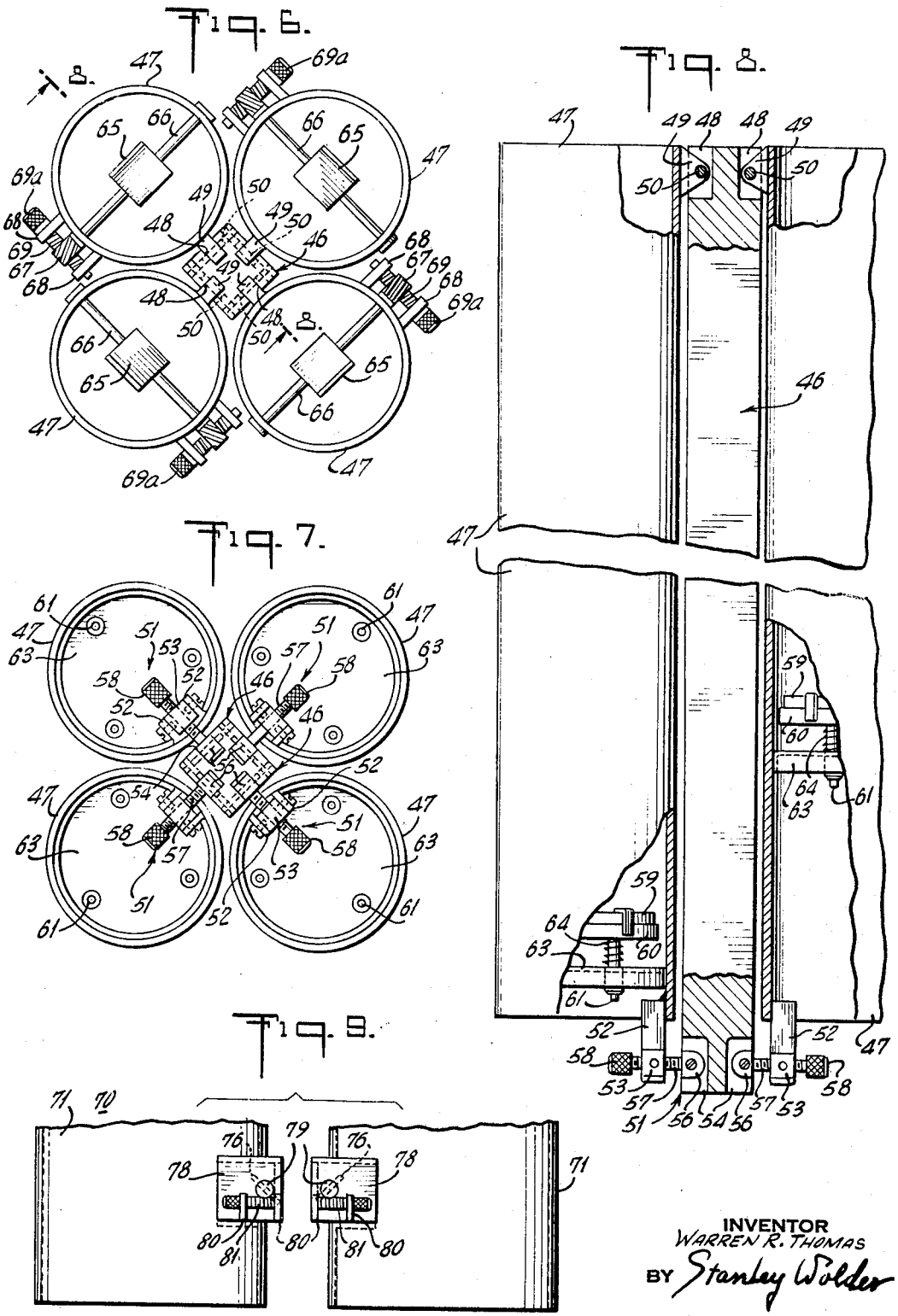

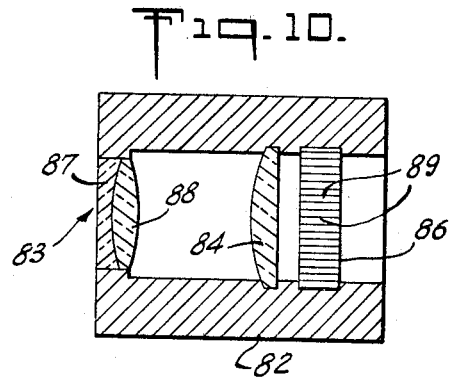
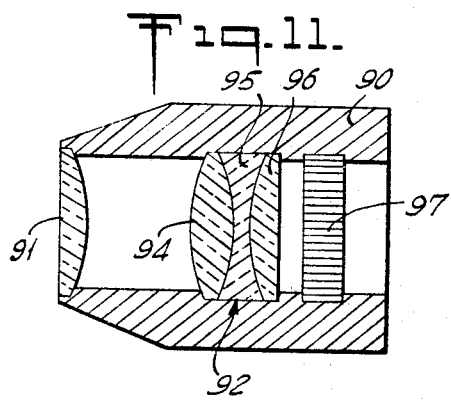
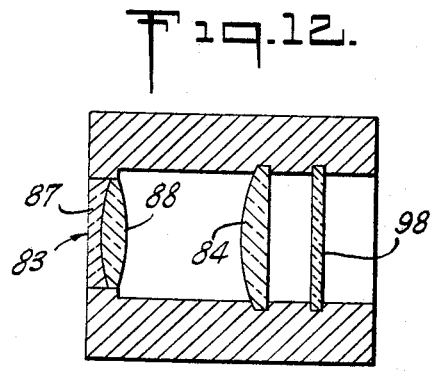

United States Patent Office 3,507,547
Patented Apr. 21, 1970

3,507,547
TELESCOPE HAVING MULTIPLE OBJECTIVE MIRRORS
Warren R. Thomas, 459 W. 260th St., Riverdale, N.Y. 10471
Continuation-in-part of application Ser. No. 375,873, June 17, 1964. This application Oct. 12, 1965, Ser. No. 505,094
Int. Cl. G02b 23/00
U.S. Cl. 350—55       1 Claim

ABSTRACT OF THE DISCLOSURE

A high resolution telescope includes a plurality of angularly adjustable objective mirror and/or lens systems for producing in a common focal plane substantially coinciding sharp images of a common object, the coinciding images having a greater resolution than any of the individual images. The images may be focussed on the front face of an optical fiber bundle and the eyepiece focussed on the rear face thereof.

---

The present invention relates, generally to improvements in optical devices and it relates more particularly to an improved telescope. The present application is a continuation-in-part of applicant's copending application Ser. No. 375,873, dated June 17, 1964, now abandoned.

It is well known that ultimate limiting factor in the quality of a telescope is the size of the objective, whether it be a mirror or a lens. The maximum possible resolution of a telescope is a direct function of the area of the objective, the greater the area the greater the possible resolution. In addition, the greater the aperture or area of the objective and hence its light gathering properties the greater is its ability to view objects of low apparent light intensity and hence distant objects. However, the difficulties encountered in the production and use of large lenses and mirrors are many and increase sharply with the size of the mirror or lens. To begin with the cost of a mirror or lens of appreciable size and comparable quality increases almost geometrically with size since optical precision and mechanical and optical difficulties increase in a like manner with size. In addition the mounting and handling of the large mirror or lens presents many problems. It must be rigidly, accurately and adjustably supported and yet protected against mechanical shock and stresses and must be compensated for and protected against temperature changes and its resulting effects. It is clear from the above that while the use of large mirrors or lenses as telescope objectives afford many advantages they also possess many drawbacks and leave much to be desired.

It is thus a principal object of the present invention to provide an improved optical device.

Another object of the present invention is to provide an improved telescope.

Still another object of the present invention is to provide an improved telescope possessing the advantages of a large aperture objective and obviating the usual drawbacks thereof.

A further object of the present invention is to provide an improved telescope of the reflector and refractor type having a high resolution.

Still a further object of the present invention is to provide a telescope less subject to condensation problems which result when there is a rapidly rising humid ambient atmosphere and an objective or mirror which rises in temperature much more slowly.

Yet another object of the present invention is to provide a telescope of the above nature characterized by its ruggedness, adaptability, high quality and low cost.

The above and other objects of the present invention will become apparent from a reading of the following description taken in conjunction with the accompanying drawings, wherein:

FIGURE 1 is a schematic view of a Newtonian reflector telescope embodying the present invention;

FIGURE 2 is a schematic view of a Cassagranian telescope embodying the present invention;

FIGURE 3 is a fragmentary detailed plan view of the telescope illustrated in FIGURE 1;

FIGURE 4 is a front end view thereof;

FIGURE 5 is a rear end view thereof;

FIGURE 5a is a sectional view taken along line 5—5 in FIGURE 5;

FIGURE 6 is a front end view of another embodiment of the present invention;

FIGURE 7 is a rear end view thereof;

FIGURE 8 is a fragmentary sectional view taken along line 8—8 in FIGURE 6;

FIGURE 9 is a fragmentary detailed plan view of the trailing end of the telescope shown in FIGURE 2;

FIGURE 10 is a longitudinal sectional view of an improved eyepiece which may be employed to advantage with the subject telescope;

FIGURE 11 is a longitudinal sectional view of another eyepiece; and

FIGURE 12 is a longitudinal sectional view of still another form of eyepiece.

In a sense the present invention contemplates the provision of an optical device comprising a plurality of transversely offset light focusing optical elements or image focusing objective systems and means for supporting and directing the light from said optical elements to focus coinciding images on a common focal plane. The main objective elements should be adjacent to each other that is, their edge to edge spacing should not exceed the diameter of the objective elements.

The present optical device while useful for many applications, for example, in telescopic cameras and the like, is advantageously in the form of a telescope. The focusing elements are the telescopic objectives which may be concave mirrors or convex lenses to provide a reflector or refractor telescope respectively. The reflector telescope may be of any of the well known classes, for example of the Newtonian or Cassagranian type. In accordance with one form of the improved telescope there is provided a plurality of tubular barrels which support at their trailing ends a corresponding plurality of axially relatively offset mirrors with their optical axes mating at the object viewer. Mirrors or reflecting prisms are disposed along the mirror optical axes and direct the light therefrom to a common focus in the area of which is deposed any desired eyepiece with which to magnify and view the image. In such form the mirrors or optical objective systems have the same focal lengths and the lengths of the paths between the respective objective mirrors and the focal plane or eyepiece, by way of the reflectors or prisms, are the same whereby identical superimposed images are produced by the objective mirrors. In order to facilitate the achievement of the substantially coinciding images each of the objective mirrors is independently longitudinally and angularly adjustable. The number of mirrors may be two or more and these may be positioned in any desired arrangement, for example, side by side, along the apices of an equilateral triangle, at the corners of a square or the like.

As applied to a refractor telescope the objective lenses are mounted proximate the leading ends of tubular barrels which may be independently longitudinally and angularly adjustable so as to be directed toward a common object. A light deflecting prism may be adjustably disposed along the optical axis of each of the objective lenses to direct the light therethrough to a common focus in the vicinity of an eyepiece and produce substantially coinciding images.

Telescopes or other optical devices constructed in the above manner possess substantially the desirable resolution and aperture of a large single objective, whether a lens or mirror. Moreover, the use of a plurality of objectives as in the present devices, overcomes many of the disadvantages and drawbacks of the single large objective being less expensive, and easier to make, mount, handle and manipulate.

Where the present telescope is employed for direct viewing, it has been found that when a conventional viewing system is employed any movement by the observer results in an undesirable relative movement of the observed images thereby reducing the resolution and clarity of observation. This has been overcome by interposing an element in the plane of the real image whereby to produce an actual image which is viewed by the observer through the eyepiece. This element may be in the form of a screen, ground glass or a fiber optic screen in which the fibers are parallel to the optical axes.

Referring now to the drawings, and more particularly to FIGURE 1 and 3 to 5a thereof which illustrate a preferred embodiment of the present invention as applied to a Newtonian reflector type telescope, the reference numeral 10 generally designates the improved telescope, which includes a plurality of tubular open ended barrels 11 of successively greater lengths, illustrated as being three in number, it being understood that two or more such barrels and the associated optical assemblies may be employed. The barrels 11 are connected by parallel hinges 12 which join the leading edges of adjacent barrels 11, and a suitable bracket or collar 13 engages one of the barrels 11 preferably the intermediate barrel to permit the suitable mounting of the telescope.

In order to effect the relative angular adjustment of the axes of the barrels 11 and hence compensate for parallax and direct the telescope sections represented by the barrels 11 toward a common object at any distance, a screw adjusting assembly 14 interconnects the trailing portions of adjacent barrels 11 to permit the angular adjustment of the barrels 11 about the axis of respective hinges 12. Each of the assemblies 14 includes a pair of transversely spaced parallel arms 16 and 17 respectively which are mounted proximate the trailing ends of adjacent barrels 11 and are parallel to the hinges 12. A pair of yoke defining longitudinally spaced legs 18 are located on the arm 16 and swingably support between them a block 19 having a tapped transverse axial bore formed therein. The block 19 is rockably mounted between the arms 18 by means of a pair of opposite shoulder screws 20 which register with corresponding openings in the arms 18 and engage tapped longitudinal bores in the block 19.

The bracket arm 17 is likewise provided with a pair of yoke defining arms 21 which support a block 22 by means of a pair of shoulder screws 20a for rocking about an axis parallel to the rocking axis of the block 19. The block 22 is provided with transverse bore substantially in alignment with the tapped bore in the block 19. An adjusting screw member 23 is provided with a threaded shank which mates and engages the tapped transverse bore in the block 19 and is provided with a cylindrical end section 24 which freely rotatably engages the bore in the block 22. A pair of peripheral shoulder members 26 is located on the screw section 24 and embrace the opposite parallel faces of the block 22 to restrict the screw 23 against any axial movement relative to the block 22. To permit the manipulation of the screw 23 it is provided with a knurled head 27. Thus the angular relationship of the barrels 11 may be finely adjusted by means of the assemblies 14 whereby to effect the direction of the axes of the barrels 11 and the associated optical systems toward a common object being viewed.

Mounted in the rear section of each of the barrels 11 is a concave forwardly directed objective mirror 28 of conventional configuration and supported for angular and longitudinal adjustment to permit collimation of the mirror with the axis of the corresponding barrel 11 and its proper location relative to the focal plane of the associated objective mirrors. A transverse plate 29 is suitably affixed to the rear end of each of the barrels 11 and is provided with three equilaterally related circumferentially spaced openings. Disposed forwardly of each of the end plates 29 is a mirror support frame 30 provided with rearwardly directed screw members 32 which register with the openings in the end plate 29 and are engaged by nuts 33 which bear on the rear face of the end plate 29. A helical compression spring 34 engages each of the screw members 32 and is entrapped between the confronting faces of the corresponding frame 30 and end plate 29. Objective mirror 28 is suitably locked to a respective mounting frame 30 by means of L-shaped locking clips 36. Thus, the orientation and axial position of each of the objective mirrors 28 may be adjusted by means of the nuts 33, for the purposes above set forth. Suitable conventional means may be provided for locking the mirror support assemblies in their adjusted positions.

Adjustably mounted in each of the barrels 11 adjacent to the leading end thereof is a secondary reflector element 37 in the form of a flat mirror or the like which is disposed along the optical axis of the corresponding objective mirror 28 and forms an angle of approximately 45° thereto. The secondary mirrors 37 are mounted on transverse parallel shaft 38 which extend diametrically across and are suitably journalled in each of the barrels 11, one of the ends of each of the shafts 38 projecting outside the wall of the respective barrel 14 and having affixed thereto a worm gear 39. A pair of bracket arms 40a is mounted on the outside face of each of the barrels 11 on opposite sides of the worm gears 39 and has journalled thereto a worm 40 which matingly engages a corresponding worm gear 39. Each of the worms 40 is provided with a knurled knob 41 which facilitates the rotation thereof and the adjustment of a corresponding secondary reflector element 37. Directed radially outwardly from an end barrel 11 is an axially adjustable eyepiece 42 and openings are provided in the barrels 11 to provide unimpeded paths to the light directed from the objective mirrors 28 and reflected by the secondary reflectors 37 to the eyepiece 42.

The objective mirrors 28 and the secondary reflector elements 37 are adjusted so that the objective mirrors 28 focus at a common point in the vicinity of the eyepiece 42, the distances from each of the objective mirrors 28 by way of a respective secondary reflector element 37 to said focal point being equal. Furthermore, the objective mirrors 28 have the same focal lengths and the objective mirrors 28 and reflector elements 37 are so related and adjusted and the barrels 11 and objective mirrors 28 so directed at a common object as to produce substantially coinciding identical images on a common focal plane.

In FIGURES 6 to 8 of the drawings there is illustrated another embodiment of the present invention also in the form of a Newtonian reflector but differing from that first described, primarily in that there are provided four barrels and corresponding optical sections arranged about a central axial support instead of the three side by side barrels of the first described embodiment. Specifically there is provided a centrally located longitudinally extending axial support bar 46 along the sides of which are disposed four quadrilaterally arranged longitudinally extending open ended barrels 47. Formed in the upper or front side faces of the support bar 46 are recesses 48 with each of which registers an arm 49 projecting radially from a corresponding barrel 47 and pivoted to the upper end of the bar 46 by a respective pin 50.

Each of the barrels 47 is angularly adjustable by means of a screw adjusting assembly 51 interconnecting the lower or trailing end of each of the barrels 47 with an adjacent face of the support bar 46. Each screw assembly 51 includes a pair of laterally spaced parallel arms 52 affixed to and depending from a corresponding barrel 47 adjacent a face of the support bar 46. Suitably journalled between the lower ends of the arms 52 is a block 53 rockable about an axis parallel to that of a corresponding pivot pin 50 and provided with a tapped longitudinal bore. Rockably supported in a recess 54 at the lower end of the support bar 46 is a block 56 which is swingable about an axis parallel to that of the block 53 and is at about the level of the block 53. An adjusting screw 57 engages the tapped bore in the block 53 and its free end is journalled in the block 56 and restricted against axial movement therein, the screw 57 being provided with a knurled head 58. Thus the angular relationship of each of the barrels relative to the support bar 46 is individually adjustable by means of corresponding screws 57 to permit the directing of the barrels 47 toward a common object under observation.

A concave objective mirror 59 is mounted adjacent the rear end of each of the barrels 47 and is longitudinally and angularly adjustable in the manner described in connection with the first embodiment. The objective mirror 59 is locked to a mounting frame 60 which is provided with three rearwardly directed screw members 61 engaging equilaterally spaced openings formed in a transverse wall 63 disposed at the rear end of a respective barrel 47. Helical springs 64 register with each of the screw members 61 and are entrapped between the frame 60 and the end wall 63, and adjusting nuts engage each of the screw members 61 and bear on the outer face of the end plate 63.

A secondary reflector element 65 which may be in the form of a flat mirror is adjustably mounted adjacent the front end of each of the barrels 47 in axial alignment with a corresponding objective mirror 59. The reflector element 65 is mounted on a diametrically extending shaft 66 journalled in and projecting beyond one side of the barrel 47, the section of the shaft 66 projecting beyond the barrel wall having a worm gear 67 affixed thereto. A pair of parallel arms 68 project from the wall each of the barrels 47 on opposite sides of respective worm gears 67 and rotatably support a worm 69 in mating engagement with the worm gear 67 and provided with a knurled head 69a to facilitate the manipulation thereof.

An axially adjustable eyepiece, not shown, is associated with the barrels and objective systems in the manner of the first described embodiment. As previously described the objective mirrors 59 are of equal focal lengths and are adjusted to focus at a common point in the area of the eyepiece and focus substantially coinciding identical images on a common focal plane. The barrels 47 are angularly adjusted to be directed at a common object under observation, being substantially parallel when viewing objects at very great distances such as any celestial object. Furthermore the telescope assembly may be suitably mounted as a unit by means of the support bar 46.

Self-evidently, the embodiment shown in FIGURES 6-8 may be adapted so as to provide a Cassagranian type of telescope similar to that shown in FIGURES 2 and 9. There are shown in the drawings illustrated in the second embodiment the ray paths as was done, in the case of FIGURE 1, in view of the fact that the view would turn out to be subsantially that of a two element system which would parallel that of the three element system shown in FIGURE 1. In the four element system there is the same need to bring the four optical systems into a common focal plane and this is best done by positioning the mirror along one of the four apices formed by the closing of the tangents of the tubes, assuming they were touching. Apertures must then be made in the tubes themselves to permit the reflected light from mirrors 65 to reflect the beam to the one focal plane at which point an objective is positioned to view the focussed image.

Referring now to FIGURES 2 and 9 of the drawing which illustrate a Cassagranian type of telescope 70 embodying the present invention, there are provided a pair of side-by-side longitudinally extending barrels 71 which are hinged to each other along their leading edges. The barrels 71 are connected at their adjacent trailing edges by a screw adjusting assembly similar to the previously described assembly 14 to permit the angular adjustment between the barrels 71. A centrally apertured forwardly directed concave objective mirror 72 is mounted in the trailing portions of each of the barrels 71 and is provided with means for longitudinally and angularly adjusting these in the manner earlier described.

A conventional secondary rearwardly directed parabolic reflector element 73 is mounted at the forward end of each barrel 70 coaxially with the respective objective mirrors 72 and behind each objective mirror 72 is positioned a reflector element 74 such as a flat mirror or 45° reflector prism in axial alignment with the corresponding objective mirror central opening. The reflector elements 74 are inclined to direct the reflected rays toward each other and a pair of angularly adjustable reflector elements 76 are disposed in the paths of the rays reflected by the elements 74 to reflect these rays to a common focus in the vicinity of an axially adjustable eyepiece 77. The eyepiece 77 is medially located between the axes of the objective lenses 72 and is forwardly directed. Each of the reflector elements 76 is mounted on a transverse shaft suitably journalled between a pair of parallel bracket plates 78 mounted on each of the barrels 71 and has a worm gear 79 affixed thereto. Affixed to one of each pair of plates 78 are a pair of arms 80 which rotatably support a worm 81 in mating engagement with the worm gear 79 and provided with a knurled manipulating head.

The objective mirrors 72 and the barrels 71 and the reflector elements 76 are adjusted in the manner earlier set forth to direct the objective mirrors to a common object under observation and to focus identical substantially coinciding images on a common focal plane which is viewed through the eyepiece 77. It should be noted that while identical images are achieved by employing objective mirrors of equal focal lengths, identical images may be obtained by employing multiple element objective systems which produce identical images even if the individual elements may vary and such systems are within the scope of the present invention and the terms objective mirror, lens, or element as herein employed.

In each of the systems there have been shown four independent tubes each containing separate reflector units and then bringing the same to a common focus, and there have been described similar systems employing lenses instead of reflector units. There need not be separate tubes since the separate optical systems which would otherwise be in the tubes as shown may be incorporated within a single common tube, there being preferably employed the usual optical expedient, i.e., the provision of baffles to prevent close diffusion between the systems in order to obtain the most distinct image.

In order to overcome the relative shifting of the images viewed by an observer attendant to the movement of the observer, viewing or eyepiece systems of the type illustrated in FIGURES 10 to 12 may be employed to advantage, for example, in the positions of the eyepieces 42 and 77. The eyepiece shown in FIGURE 10 employs a Kellner type lens system and includes a barrel 82 which is mounted in the conventional manner for longitudinal adjustment. Supported in the barrel 82 and coaxially arranged are a rear lens 83, a front lens 84, and an image receiving or projection element 86. The lens 83 includes a plano-concave rear lens element 87 and a mating double convex front lens element 88 and the lens 84 is plano-convex, the plane face being forwardly directed.

The image receiving element 86 is formed of optical fibers 89 in the known manner, the optical fibers 89 being advantageously parallel to the eyepiece optical axis. The front face of the image element 86 advantageously lies in the focal plane of the multiple objectives and the rear face thereby advantageously in the focal plane of the eyepiece lens system 83–84. While the image element is preferably in the form of a thin plate it may be of a configuration which more closely conforms to the multiple image focal plane and the eyepiece focal plane.

In operation, the multiple rear images produced by the multiple objectives as aforesaid, are projected in overlapping relationship onto the front face of the image element 86. Since the image appearing on the rear face of the image element 86 consists of a plurality of points from each of which the light conically projects independently of the angle of light directed on the corresponding optical fiber, the image on the front face of the image element 86 is of the nature of an actual image. As a consequence, the observer views an actual image through the eyepiece lens system and any movement of the observer does not adversely affect the clarity or resolution of observation. The resolution is limited to the cross-sectional areas of the individual fibers 89, the smaller the transverse cross-section, the greater the resolution. The optical fibers 89 and the sheathing or bonding material are of parameters well known in the art. It should be noted that the lens system 83–84 may be mounted in a separate barrel so as to be longitudinally adjustable relative to the image element 86.

The eyepiece illustrated in FIGURE 11 differs from that last described only in that an orthoscopic lens system is employed in place of the Kellner lens system. Specifically, the eyepiece includes a suitably adjustably supported barrel 90 in which are mounted a rear plano-convex lens 91 and a forwardly spaced front lens 92 including a double convex rear lens element 94 an intermediate double concave lens element 95 and a front plano-convex lens element 96, the lenses 91 and 92 forming an orthoscopic lens system. Also mounted in the barrel 90 forward of the lens 92 is a fiber optic image receiving element 97 of the same general construction as the element 86 and related to the objective system and the lens system 91–92 in the manner the element 86 is related to its objective system and lens system 83–84. The functioning and operation of the eyepiece last described is similar to that shown in FIGURE 10.

In FIGURE 12 of the drawing, there is illustrated an eyepiece which is similar to the eyepiece illustrated in FIGURE 10 and differs therefrom only in that a ground glass screen 98 or other, similar image receiving or projection element or screen is substituted for the fiber optical element 86. The screen 98 is positioned in the real image focal plane of the associated objective system and in the viewing plane of the eyepiece lens system. In all other respects the eyepiece of FIGURE 12 and its functioning is similar to that illustrated in FIGURE 10. It should be noted that other eyepiece lens systems may be employed in place of those specifically described.

While there have been described and illustrated preferred embodiments of the present invention, it is apparent that numerous alterations, omissions and additions may be made without departing from the spirit thereof.

What is claimed is:

1. A telescope comprising a plurality of tubular barrels, means supporting said barrels in side by side relationship with their axes substantially parallel, means for adjusting the angular relationship of the axes of said barrels, at least one sharp image focusing optical reflector element in each barrel, said reflector elements being of identical focal length, reflecting means aligned with each barrel for directing each image laterally to different respective points more closely spaced than the axes of the respective barrels, additional reflecting means at said closely spaced points for directing each image to a common focal plane, said images being in substantially coinciding relation in said plane to produce a real image of greater resolution than any of said individual images, means disposed in said focal plane for converting said real image to an actual image comprising a bundle of parallel optical fibers having substantially parallel front and rear faces, and an eyepiece supported for viewing said actual image.

References Cited

UNITED STATES PATENTS

| 1,454,218 | 5/1923 | Folmer | 350—174 X |
| 1,549,579 | 8/1925 | Lenouvel | 350—31 X |
| 1,578,899 | 3/1926 | Lohmann. | |
| 1,640,694 | 8/1927 | Deming | 350—9 X |
| 2,409,186 | 10/1946 | Bouwers | 350—34 X |
| 2,413,286 | 12/1946 | Buchele | 350—36 X |
| 2,934,995 | 5/1960 | Riesenberg | 350—294 X |
| 2,987,961 | 6/1961 | Cotton et al. | 350—292 |
| 3,173,012 | 3/1965 | Winter. | |
| 3,325,238 | 6/1967 | Geier | 350—294 X |
| 1,921,630 | 8/1933 | Mechau. | |

FOREIGN PATENTS 21,456   9/1909  Great Britain.

DAVID SCHONBERG, Primary Examiner

J. W. LEONARD Assistant Examiner

U.S. Cl. X.R.

350—27, 31, 71, 174, 293, 299